(12) United States Patent
Watabe

(10) Patent No.: US 7,376,448 B2
(45) Date of Patent: May 20, 2008

(54) HETERODYNE RECEIVER AND COMMUNICATION SYSTEM WITH DEMODULATOR SWITCHABLE BETWEEN DEMODULATION SCHEMES BASED ON RECEIVED STATUS SIGNAL

(75) Inventor: Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 448 days.

(21) Appl. No.: 11/148,281

(22) Filed: Jun. 9, 2005

(65) Prior Publication Data

US 2005/0277401 A1 Dec. 15, 2005

(30) Foreign Application Priority Data

Jun. 10, 2004 (JP) .............................. 2004-172419

(51) Int. Cl.
*H04M 1/00* (2006.01)
(52) U.S. Cl. .................. 455/569.2; 455/352; 455/345; 455/575.9; 340/426.16; 340/426.2; 340/7.33
(58) Field of Classification Search ................ 455/334, 455/424, 425, 456.5, 456.6, 561, 67.13, 147, 455/150.1, 161.2, 165.1, 164.1, 173.1, 182.1, 455/183.1, 186.1, 192.1, 192.2, 257, 258, 455/260; 375/309, 259, 312, 344, 300, 311, 375/327, 364, 354, 373, 376, 215, 136, 147, 375/149, 240, 28, 316; 340/5.62, 5.31, 425.2, 340/825.69, 426.23, 426.17
See application file for complete search history.

(56) References Cited

U.S. PATENT DOCUMENTS

| | | | | |
|---|---|---|---|---|
| 3,573,355 A | * | 4/1971 | Cavelos ................... 455/253.2 |
| 3,864,636 A | * | 2/1975 | Fukuda et al. ............... 455/259 |
| 4,155,043 A | * | 5/1979 | Sakamoto ................. 455/182.1 |
| 4,240,115 A | * | 12/1980 | Kamiya ....................... 348/732 |
| 4,380,826 A | * | 4/1983 | Usugi ....................... 455/165.1 |
| 4,392,254 A | * | 7/1983 | Ecklund ................... 455/173.1 |
| 4,394,778 A | | 7/1983 | Ikeguchi et al. |
| 4,630,118 A | * | 12/1986 | Suzuki ....................... 348/735 |
| 4,647,847 A | * | 3/1987 | Roos ....................... 324/76.41 |
| 4,709,406 A | * | 11/1987 | Omoto ....................... 455/208 |
| 4,727,591 A | * | 2/1988 | Manlove .................. 455/182.2 |
| 4,814,887 A | * | 3/1989 | Marz et al. ................. 348/735 |
| 4,932,072 A | * | 6/1990 | Toko ............................. 455/76 |
| 5,574,998 A | * | 11/1996 | Andoh ..................... 455/182.2 |

(Continued)

FOREIGN PATENT DOCUMENTS

JP 56-57324 5/1981

(Continued)

*Primary Examiner*—Edward F. Urban
*Assistant Examiner*—Charles Chow
(74) *Attorney, Agent, or Firm*—Posz Law Group, PLC

(57) ABSTRACT

The heterodyne receiver includes an antenna, a local oscillator, a mixer mixing a signal received by the antenna with a local oscillation signal generated by the local oscillator to produce an IF signal, and a demodulator demodulating the IF signal. The local oscillator is configured to set a frequency of the local oscillation signal at such a frequency that a frequency of the IF signal becomes a predetermined intermediate frequency when any one of intended signals having frequencies within a predetermined frequency range is being received by the antenna, and to fix the frequency of the local oscillation signal at a predetermined oscillation frequency when any one of the intended signals is not being received by the antenna.

2 Claims, 5 Drawing Sheets

U.S. PATENT DOCUMENTS

| | | | |
|---|---|---|---|
| 5,722,058 A * | 2/1998 | Umemoto et al. | 455/140 |
| 5,822,373 A * | 10/1998 | Addy | 375/259 |
| 6,075,996 A * | 6/2000 | Srinivas | 455/552.1 |
| 6,275,699 B1 * | 8/2001 | Ichihara | 455/434 |
| 6,628,340 B1 * | 9/2003 | Graczyk et al. | 348/552 |
| 2005/0003773 A1 * | 1/2005 | Cowley et al. | 455/150.1 |
| 2005/0099820 A1 * | 5/2005 | Cooper | 362/500 |
| 2005/0132994 A1 * | 6/2005 | Itou et al. | 123/179.3 |
| 2006/0258313 A1 * | 11/2006 | Uozumi et al. | 455/252.1 |

FOREIGN PATENT DOCUMENTS

| | | |
|---|---|---|
| JP | 61-141225 | 6/1986 |
| JP | 11-4177 | 1/1999 |
| JP | 11-103262 | 4/1999 |
| JP | 2000-286738 | 10/2000 |

* cited by examiner

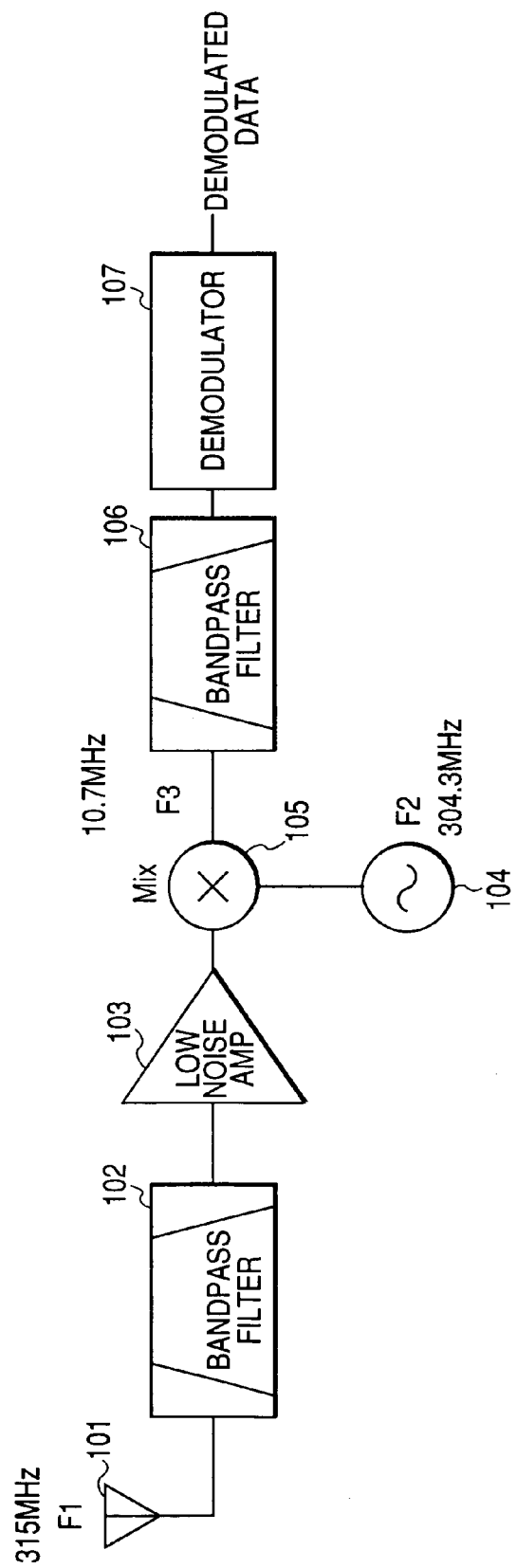

HETERODYNE RECEIVER AND COMMUNICATION SYSTEM WITH DEMODULATOR SWITCHABLE BETWEEN DEMODULATION SCHEMES BASED ON RECEIVED STATUS SIGNAL

CROSS REFERENCE TO RELATED APPLICATION

This application is related to Japanese Patent Application No. 2004-172419 filed on Jun. 10, 2004, the contents of which are hereby incorporated by reference.

BACKGROUND OF THE INVENTION

1. Field of the Invention

The present invention relates to a heterodyne receiver, and a communication system using the heterodyne receiver.

2. Description of Related Art

Heterodyne receivers having a downconverter for downconverting a received radio signal (may be referred to as high frequency signal hereinafter) to an IF (Intermediate Frequency) signal before demodulating this received high-frequency signal are widely used.

FIG. 5 shows a structure of a common heterodyne receiver. This heterodyne receiver includes an antenna 101, a bandpass filter 102, a low noise amplifier 103, a local oscillator 104, a mixer 105, a bandpass filter 106, and a demodulator 107.

A radio signal received by the antenna 101 is band-limited by the bandpass filter 102, and then amplified by the amplifier 103. The signal amplified by the amplifier 103 is mixed with (or multiplied by) a local oscillation signal having a fixed frequency outputted from the local oscillator 104 to be downconverted into an IF signal. The IF signal is band-limited by the bandpass filter 106, and then demodulated by the demodulator 107 to produce demodulated data.

When the frequency of a radio signal intended to be received and demodulated is F1, and the frequency of the local oscillation signal generated by the local oscillator 104 is F2, the frequency F3 of the downconverted IF signal becomes F1−F2. Accordingly, in a case where F1 is 315 MHz and F3 is set at 10.7 MHz, it is necessary for the local oscillator 104 to generate an oscillation signal having a frequency of F2=F1−F3=304.3 MHz. The local oscillator 104 can generate the 304.3 MHz oscillation signal through about 5 times frequency multiplication on a 60 MHz oscillation signal obtained by use of quartz, for example.

It is also known to constitute such a local oscillator by a PLL circuit as described, for example, in Japanese Patent Application Laid-open No. 2000-286738.

Incidentally, vehicles are becoming equipped with different in-vehicle wireless systems such as the tire pressure monitoring system, remote key entry system and smart key system. Accordingly, it is becoming necessary to mount different receives corresponding to these different systems on each vehicle, because these systems use different frequencies.

SUMMARY OF THE INVENTION

The heterodyne receiver of the invention includes:
an antenna;
a local oscillator;
a mixer mixing a signal received by the antenna with a local oscillation signal generated by the local oscillator to produce an IF signal; and
a demodulator demodulating the IF signal,
wherein the local oscillator is configured to set a frequency of the local oscillation signal at such a frequency that a frequency of the IF signal becomes a predetermined intermediate frequency when any one of intended signals having frequencies within a predetermined frequency range is being received by the antenna, and to fix the frequency of the local oscillation signal at a predetermined oscillation frequency when any one of the intended signals is not being received by the antenna.

The heterodyne receiver of the invention can automatically lock up the IF signal at the set frequency in a short time when the frequency of the radio signal received by the antenna has changed.

Accordingly, in accordance with the present invention, it becomes possible to receive different radio signals having different frequencies used by different in-vehicle systems by use of a single receiver.

In a communication system including the heterodyne receiver and at least one transmitter, it is desirable that the transmitter is configured to transmit a send signal having a preamble part containing only invalid data, and the preamble part has a time length longer than a time required for the heterodyne receiver to lock up the IF signal at the predetermined intermediate frequency.

BRIEF DESCRIPTION OF THE DRAWINGS

In the accompanying drawings:

FIG. 5 is a block diagram showing a structure of a conventional heterodyne receiver.

PREFERRED EMBODIMENTS OF THE INVENTION

First Embodiment

Figure 1:
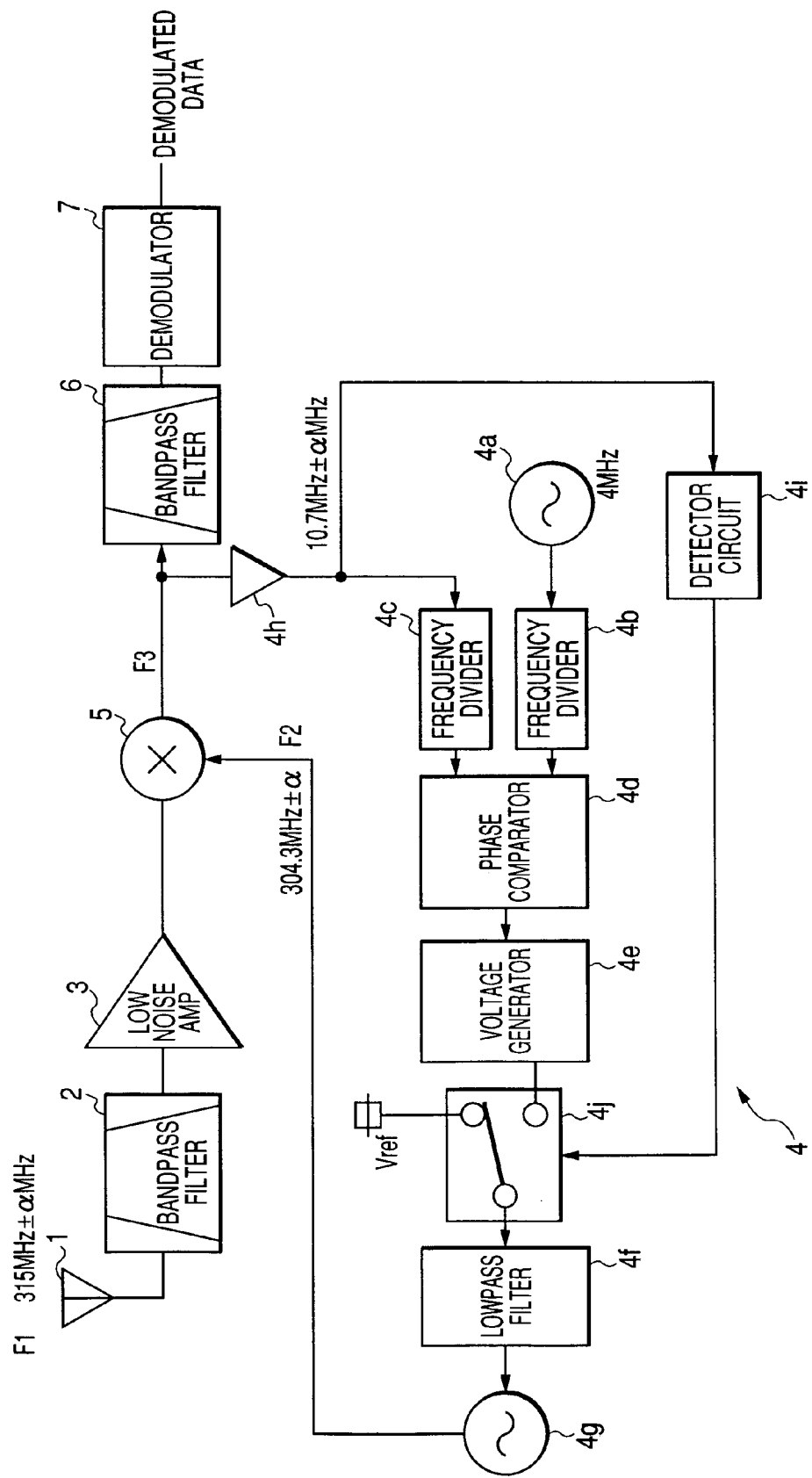
FIG. 1 is a block diagram showing a structure of a heterodyne receiver according to a first embodiment of the invention.

FIG. 1 is a block diagram showing a structure of a heterodyne receiver according to a first embodiment of the invention. This heterodyne receiver can be used, for example, as a vehicle-mounted receiver for in-vehicle wireless systems.

As shown in FIG. 1, this heterodyne receiver includes an antenna 1, a bandpass filter 2, a low noise amplifier 3, a local oscillator 4, a mixer 5, a bandpass filter 6, and a demodulator 7.

The antenna 1, bandpass filters 2, 6, mixer 5, and demodulator 7 are the same in structure as the antenna 101, bandpass filters 102, 106, mixier 105, and demodulator 107 shown in FIG. 5, respectively.

The local oscillator 4, which is constituted as a PPL circuit, includes a quartz oscillator 4a, a reference frequency divider 4b, a comparison frequency divider 4c, a phase comparator 4d, a voltage generator 4e, a switch 4j, a lowpass filter 4f, a voltage controlled oscillator 4g, an amplifier 4h, and a detector circuit 4i. When this heterodyne receiver is used as a vehicle-mounted receiver for the tire pressure monitoring system, the quarts oscillator 4a may have quarts oscillating at 4 MHz.

The reference frequency divider 4b frequency-divides the oscillation signal by R outputted from the quarts oscillator 4a, thereby producing a 25 kHz reference signal.

The comparison frequency divider 4c frequency-divides the downconverted IF signal having the frequency of F3 by V, thereby producing a signal having the frequency about the same as the 25 kHz reference signal produced by the reference frequency divider 4b.

The phase comparator 4d detects a phase difference between the signals produced by the reference frequency divider 4b and the comparison frequency divider 4c, and outputs a voltage signal whose voltage level depends on the sign of the detected phase difference.

The voltage generator 4e is for supplying one of two different voltages selected depending on the level of the voltage signal outputted from the phase comparator 4d to the lowpass filter. 4f through the switch 4j as a first frequency control voltage. The voltage generator 4e may include a PNP transistor and an NPN transistor which are on-off controlled by the voltage signal outputted from the phase comparator 4d and connected in series between a power supply voltage line and a ground voltage line. In this case, when the PNP transistor is turned on and the NPN transistor is turned off, the lowpass filter 4f, which is connected to a connection node of the PNP and the NPN transistors, is applied with the power supply voltage through the connection node, while, when the PNP transistor is turned off and the NPN transistor is turned on, the lowpass filter 4f is applied with the ground voltage through the connection node.

The lowpass filter 4f is for producing a second frequency control voltage by integrating the first frequency control voltage (the power supply voltage or ground voltage) outputted from the voltage generator 4e. The lowpass filter 4f may include a capacitor one terminal of which is connected to the connection node of the PNP and NPN transistors through a resistor and the other terminal of which is connected to the ground voltage line.

The voltage controlled oscillator 4g is for producing the local oscillation signal having a frequency depending on the second frequency control voltage outputted from the lowpass filter 4f. For example, the voltage controlled oscillator 4g may be an LC oscillator circuit. When the heterodyne receiver is used as a vehicle-mounted receiver for the tire pressure monitoring system, the voltage controlled oscillator 4g outputs a 304.3 MHz signal as the local oscillation signal.

The amplifier 4h is for amplifying the IF signal, and supplies it to the comparison frequency divider 4c and the detector circuit 4i.

The detector circuit 4i is for detecting whether any of the intended signals is being received by the antenna 1 on the basis of the IF signal produced by the mixer 5, and outputs an on/off control signal to the switch 4j. To be more precise, the detector circuit 4i judges that one of the signals intended to be received and demodulated is being received by the antenna 1, and supplies an ON signal to the switch 4, if the frequency of the signal received from the amplifier 4h is within a predetermined frequency range (in the vicinity of 10.7 MHz, for example). On the other hand, the detector circuit 4i judges that none of the signals intended to be received and demodulated is being received by the antenna 1, and supplies an OFF signal to the switch 4j, if the frequency of the signal received from the amplifier 4h is outside the predetermined frequency range.

The switch 4j has a movable contact connected to the lowpass filter 4f, a first fixed contact applied with a reference voltage Vref, and a second fixed contact applied with the output voltage of the voltage generator 4e. While the switch 4j receives the On signal from the detector circuit 4i, it makes a connection between the movable contact and the first fixed contact so that the lowpass filter 4f is applied with the reference voltage Vref. On the other hand, while the switch 4j receives the OFF signal from the detector circuit 4i, it makes a connection between the movable contact and the second fixed contact so that the lowpass filter 4f is applied with the output voltage of the voltage generator 4e.

Next, the operation of the heterodyne receiver having the above described structure is explained below.

Before any intended signal is received by the antenna 1, the switch 4j is in a state where the movable contact is connected to the first fixed contact to supply the lowpass filter 4f with the reference voltage Vref.

In this state, the voltage controlled oscillator 4g produces an oscillation signal having a fixed frequency (304.3 MHz, for example) as the local oscillation signal.

When a signal having the frequency of F1 (315 MHz, for example) starts to be received by the antenna 1, this received signal passes through the bandpass filter 2 and is amplified by the low noise amplifier 3. This amplified signal is mixed with the local oscillation signal by the mixer 5 to be downconverted to the IF signal having the frequency of F3=F1−F2 (10.7 MHz, for example). This IF signal is supplied to the detector circuit 4i after being amplified by the amplifier 4h. The detector circuit 4i, upon detecting the frequency F3 of the IF signal to be within the range of 10.7 MHz±αMHz, outputs the ON signal to the switch 4j. α is a frequency value to be determined on the basis of the frequencies of the signals intended to be received and demodulated by the heterodyne receiver.

As a result, the movable contact is connected to the second fixed contact, so that the lowpass filter 4f is applied with the output voltage of the voltage generator 4e. As explained above, while any intended signal is received by the antenna 1, the local oscillator 4 operates as a PLL circuit to produce the IF signal by mixing the received signal with the local oscillation signal, and the frequency of the local oscillation signal is adjusted to such a value that the IF signal has the intended frequency (10.7 MHz, for example).

On the other hand, while none of the intended signals is received by the antenna 1, the voltage controlled oscillator 4g produces the local oscillation signal having the fixed oscillation frequency (304.3 MHz, for example) by being supplied with the reference voltage Vref. That is because, if the voltage controlled oscillator 4g oscillates at a too high or too low frequency, the local oscillator 4 cannot change to the state in which it operates as a PLL circuit when any intended signal starts to be received by the antenna 1. The provision of the switch 4j makes it possible to prevent the voltage controlled oscillator 4g from oscillating at a too high or too low frequency, thereby keeping the frequency of the IF signal within the predetermined frequency range.

Preferably, the reference voltage Vref is set at such a value that the fixed oscillation becomes equal to the difference between the center frequency of the bandpass filter 2 and the intended intermediate frequency (10.7 MHz, for example).

As explained above, in this embodiment, the local oscillator 4 is constituted as a PLL circuit, and not the output of the voltage controlled oscillator 4g but the IF signal produced by the mixer 5 is fed back to the local oscillator 4. While none of the intended signals is received by the antenna 1, the voltage controlled oscillator 4g is supplied with the fixed reference voltage Vref instead of the loop voltage, whereas while any one of the intended signals is received by the antenna 1, the voltage controlled oscillator 4g is supplied with the loop voltage.

The heterodyne receiver according to this embodiment can automatically lock up the IF signal to the intended intermediate frequency (10.7 MHz, for example) in a short time when the frequency of the radio signal received by the antenna has changed for the structure described above. Accordingly, the heterodyne receiver according to this embodiment can be used as a vehicle-mounted receiver capable of receiving different radio signals having different frequencies used by different in-vehicle systems.

Figure 2:
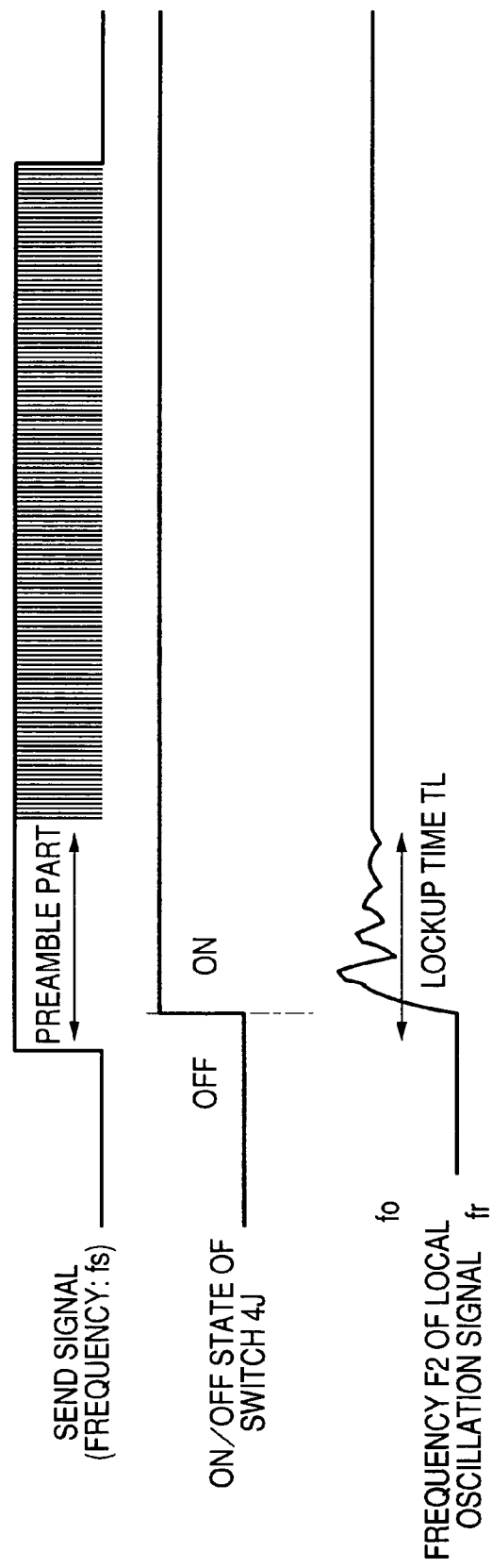
FIG. 2 is a time diagram of a send signal received by the heterodyne receiver, a switch for supplying one of a loop voltage and a reference voltage to a voltage controlled oscillator of the heterodyne receiver, and a frequency of a local oscillation signal produced by the voltage controlled oscillator.

In a data transmission system using the heterodyne receiver according to this embodiment, it is desirable that a send signal transmitted from a transmitter side has a preamble part as shown in FIG. 2, because it takes some time to lock up the IF signal to the intended intermediate frequency at a receiver side.

As shown in this figure, the switch 4j changes from an off state in which the lowpass filter 4f is supplied with the reference voltage Vref to an on state in which the lowpass filter 4f is supplied with the loop voltage a certain time after the send signal having a frequency fs is received by the antenna of the heterodyne receiver. As a consequence of this change, the frequency F2 of the local oscillation signal produced by the voltage controlled oscillator 4g begins to change from fr corresponding to the reference voltage Vref towards fo corresponding to the loop voltage. After a lapse of a lockup time TL from the time when the switch 4j changed to the on state, the frequency F2 of the local oscillation signal converges to fo. The fluctuation of the frequency F2 during the lockup period depends on the loop gain and damping factor of the loop of the PLL circuit. During the lockup period, the frequency F2 does not settle at fo.

The preamble part of the send signal, which contains only invalid data (dummy data), has a time length longer than the lockup time TL, so that valid data contained in the send signal is received with reliability after the lockup period.

Second Embodiment

Figure 3:
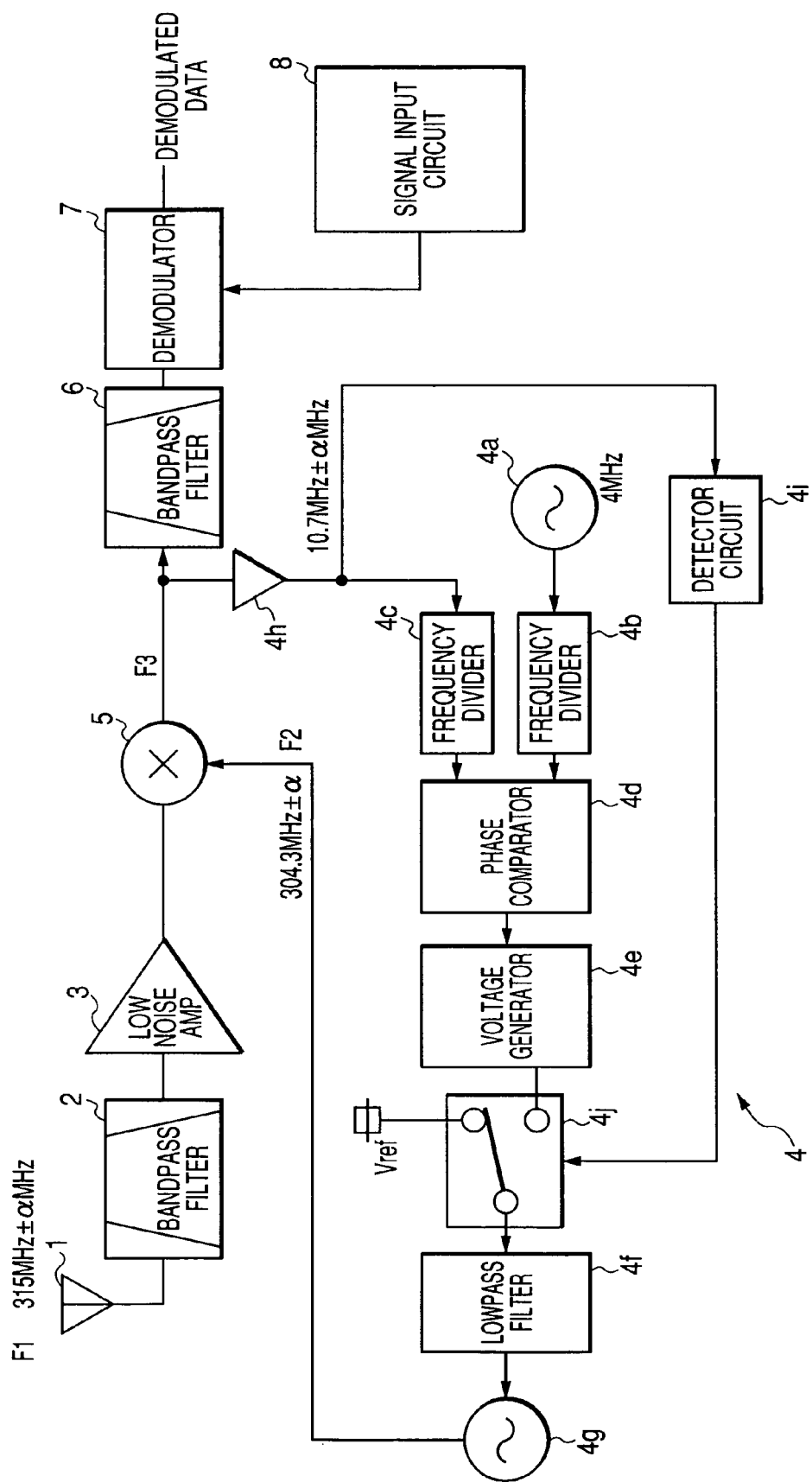
FIG. 3 is a block diagram showing a structure of a heterodyne receiver according to a second embodiment of the invention.

FIG. 3 is a block diagram showing a structure of a heterodyne receiver according to a second embodiment of the invention. Since the second embodiment is the same as the first embodiment in their core structures, only part of the second embodiment not included in the first embodiment is explained below.

In the second embodiment, the demodulator 7 receives a ignition switch status signal indicative of whether an ignition switch of a vehicle is on or off, or a vehicle running status signal indicative of whether the vehicle is running or not (vehicle speed signal, for example) from a signal input part 8.

In a case where the vehicle is provided with two or more in-vehicle wireless systems using different modulation/demodulation schemes, the demodulator 7 has to select an appropriate demodulation scheme depending on which of the wireless systems is in operation. For example, in a case where the vehicle is provided with the remote key entry system or smart key system using the AM modulation/demodulation scheme and the tire pressure monitoring system using the FM modulation scheme, the demodulator 7 has to switch between the FM demodulation scheme and the AM demodulation scheme.

With this embodiment, it becomes possible for the demodulator 7 to make selection between the AM demodulation scheme and the FM demodulation scheme properly, since it is good enough if the tire pressure monitoring is in operation only when the ignition switch is in the on state or the vehicle is running, and the remote key entry system or the smart key system is in operation only when the ignition switch is in the off state or the vehicle is stopped.

Third Embodiment

Figure 4:
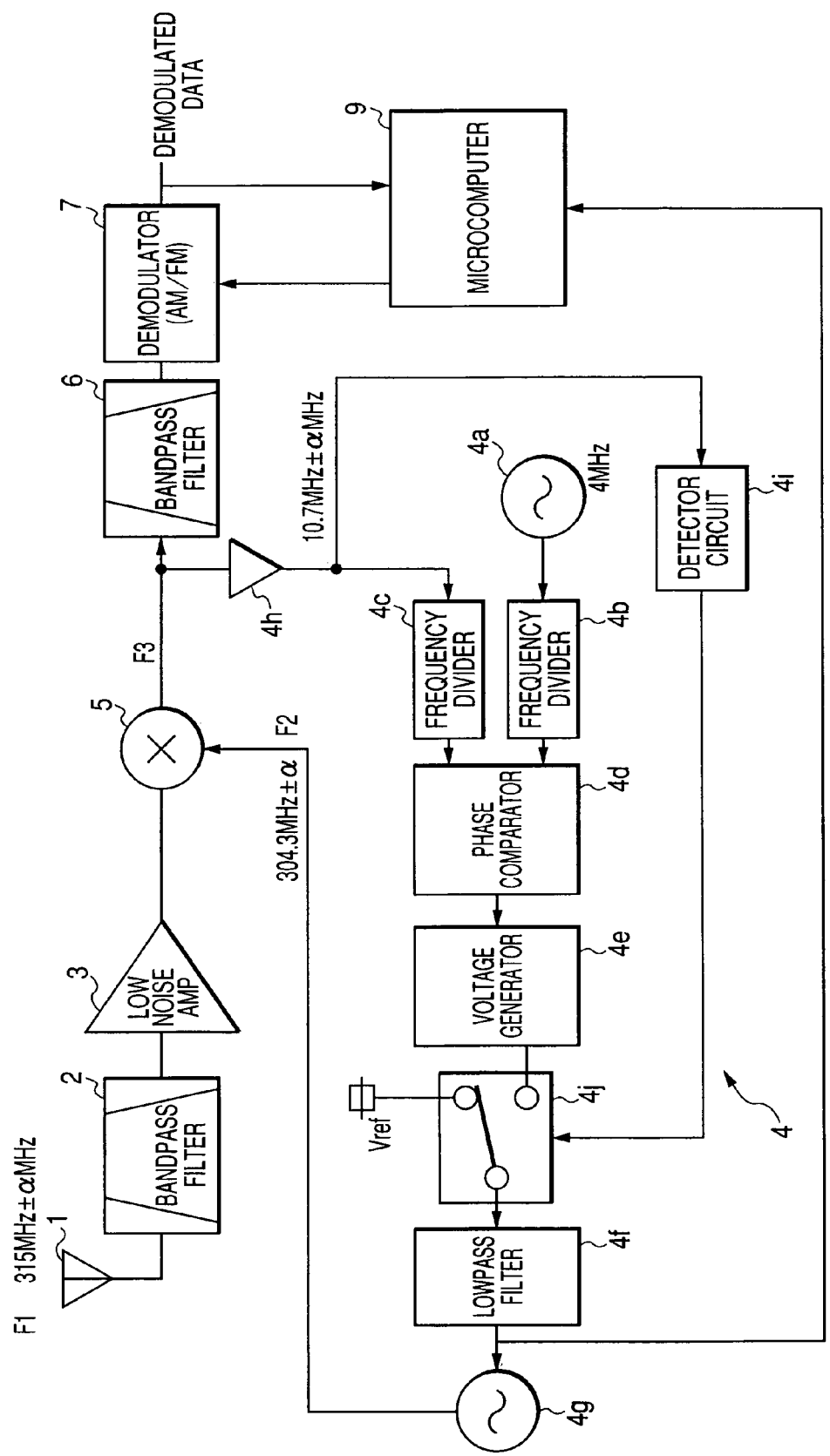
FIG. 4 is a block diagram showing a structure of a heterodyne receiver according to a third embodiment of the invention.

FIG. 4 is a block diagram showing a structure of a heterodyne receiver according to a third embodiment of the invention. Since the third embodiment is the same as the first embodiment in their core structures, only part of the third embodiment not included in the first embodiment is explained below.

The heterodyne receiver according to the third embodiment is provided with a microcomputer 9 configured to receive demodulated data outputted from the demodulator 7 and the analog output voltage of the lowpass filter 4f, and to output a demodulation scheme selection signal to the demodulator 7. The demodulator 7 is configured to switch between different demodulation schemes, for example, between the AM demodulation scheme and the FM demodulation scheme in accordance with the demodulation scheme selection signal received from the microcomputer 9.

The voltage supplied to the voltage controlled oscillator 4g from the lowpass filter 4f changes depending on the frequency F1 of the signal received by the antenna 1. Accordingly, it is possible to know the frequency F1 of the received signal by monitoring the analog output voltage of the lowpass filter 4f. The microcomputer 9 has a memory storing the relationship between the frequency F1 and the analog output voltage of the lowpass filter 4f, and also the frequencies and the demodulation schemes of the signals intended to be received and demodulated. Accordingly, the microcomputer 9 can judge which demodulation scheme should be used on the basis of the analog output voltage of the lowpass filter 4f.

If the in-vehicle wireless systems have different modulation rates (modulation frequencies), it is desirable to prestore information on the modulation rate for each of these systems in the memory of the microcomputer 9 so that the demodulator 7 can perform the demodulation operation more properly on the basis of the information about the modulation rate supplied from the microcomputer 9.

Also in a data transmission system using the heterodyne receiver according to the second or third embodiment, it is possible to use the send signal having the preamble part explained in the first embodiment.

The above explained preferred embodiments are exemplary of the invention of the present application which is described solely by the claims appended below. It should be understood that modifications of the preferred embodiments may be made as would occur to one of skill in the art.

What is claimed is:

1. A heterodyne receiver comprising:
an antenna;
a local oscillator;
a mixer mixing a signal received by said antenna with a local oscillation signal generated by said local oscillator to produce an IF signal;
a demodulator demodulating said IF signal,
wherein said local oscillator is configured to set a frequency of said local oscillation signal at such a frequency that a frequency of said IF signal becomes a predetermined intermediate frequency when any one of intended signals having frequencies within a predetermined frequency range is being received by said antenna, and to fix said frequency of said local oscillation signal at a predetermined oscillation frequency when any one of said intended signals is not being received by said antenna; and
a signal input device supplying said demodulator with an ignition switch status signal indicative of whether an ignition switch of a vehicle to which said heterodyne receiver is mounted is in an on state or an off state, said demodulator being configured to switch between different demodulation schemes in accordance with said ignition switch status signal received from said signal input device,
wherein said demodulator is configured to change to a first demodulation scheme suitable for a remote key entry system or a smart key system when said ignition switch status signal received from said signal input device indicates that said ignition switch is in the off state, and to a second demodulation scheme suitable for a tire pressure monitoring system when said ignition switch status signal received from said signal input device indicates that said ignition switch is in the on state.

2. A heterodyne receiver comprising:
an antenna;
a local oscillator;
a mixer mixing a signal received by said antenna with a local oscillation signal generated by said local oscillator to produce an IF signal;
a demodulator demodulating said IF signal,
wherein said local oscillator is configured to set a frequency of said local oscillation signal at such a frequency that a frequency of said IF signal becomes a predetermined intermediate frequency when any one of intended signals having frequencies within a predetermined frequency range is being received by said antenna. and to fix said frequency of said local oscillation signal at a predetermined oscillation frequency when any one of said intended signals is not being received by said antenna; and
a signal input device supplying said demodulator with a vehicle running status signal indicative of whether a vehicle to which said heterodyne receiver is mounted is in a running state or a stopped state, said demodulator being configured to switch between different demodulation schemes in accordance with said vehicle running status signal received from said signal input device,
wherein said demodulator is configured to change to a first demodulation scheme suitable for a remote key entry system or a smart key system when said vehicle running status signal received from said signal input device indicates that said vehicle is in the stopped state, and to a second demodulation scheme suitable for a tire pressure monitoring system when said vehicle running status signal received from said signal input device indicates that said vehicle is in the running state.

\* \* \* \* \*